United States Patent Office 3,312,912
Patented Apr. 4, 1967

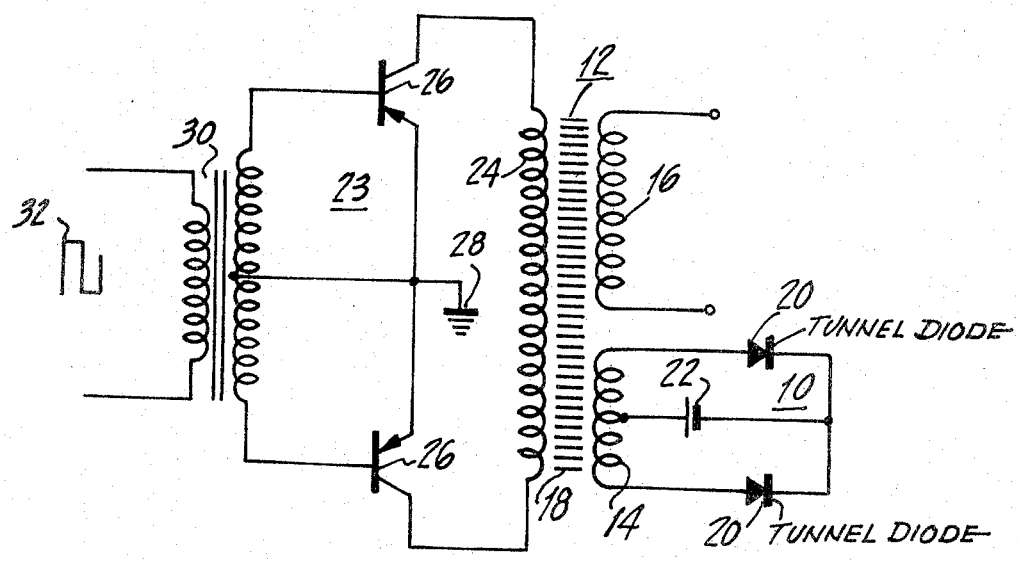

3,312,912
FREQUENCY STABILIZING OF TUNNEL DIODE INVERTERS BY MOMENTARILY OVERLOADING THE INVERTER
Rubin Feryszka, Somerville, N.J., assignor to Radio Corporation of America, a corporation of Delaware
Filed June 28, 1965, Ser. No. 467,534
5 Claims. (Cl. 331—107)

This invention relates to a frequency stabilizer for a tunnel diode inverter.

Known apparatus for changing heat directly into electricity, such as thermoelectric and thermionic apparatus, may produce a great deal of direct current, in the hundreds of amperes, at very low voltage; that is, at less than one volt. At this low voltage, the produced current has limited, if any, practical use. A known way of changing a low voltage direct current to high voltage is to invert the direct current into an alternating current and then to transform the produced alternating current up to any desired voltage. The resultant voltage may be used either in alternating current form or it may be rectified if desired.

A known inverter for inverting such low voltage direct current is a tunnel diode inverter such as is described hereinbelow. However, the known tunnel diode inverter is not frequency stable with changes in load. That is, the polarity of the output of the tunnel diode inverter changes upon saturation of a saturable core comprising part of the tunnel diode inverter, and since the time between saturations of the saturable core varies with the load, the frequency of the inverter varies as the load on the tunnel diode inverter changes. For most practical purposes, it is desirable that the alternating current produced by the tunnel diode inverter be constant in frequency.

It is an object of this invention to provide apparatus for stabilizing the frequency of the output of a tunnel diode inverter.

It is a further object of this invention to provide the combination of a tunnel diode inverter, the frequency of the output of which varies with the load applied thereto, and a frequency stabilizing apparatus.

The tunnel diode inverter to be stabilized may include two tunnel diodes and a saturable core as means to shift the flow of current from one tunnel diode to the other upon saturation, thereby to cause reversal of the current flow in the output. In such a tunnel diode inverter, under normal load conditions, the frequency of the inverter is directly proportional to output voltage thereof. Since the output voltage decreases as the load on the inverter increases, the frequency of the inverter decreases with increase of load. Furthermore, an overload may actually prevent saturation of the core, the overload itself determining the time of shifting of the current flow from one diode to the other and therefore the frequency of the inverter, as will be explained. The tunnel diode inverter therefore changes frequency as the load thereon changes. According to this invention, a circuit is provided for overloading the tunnel diode inverter momentarily and periodically twice per cycle of a control signal having a frequency higher than the highest frequency that the tunnel diode inverter will assume over its load range if it were not stabilized in frequency. The overload device may comprise a transistorized short-circuiting switch connected across an additional winding on the saturable core and a source of periodic control voltages for operating the transistorized switch. Since the switch itself requires no power supply or biasing voltage and since the switch is closed for a very short period of time during each cycle, a minimum amount of power is dissipated thereby.

The several features of this invention both as to its organization and method of operation, as well as additional objects and advantages thereof will be understood more readily from the following description when read in conjunction with the accompanying drawing in which the sole figure is a circuit diagram of an embodiment of this invention.

In the sole figure, the inverter whose frequency is to be stabilized is shown as a known tunnel diode inverter 10. The inverter 10 comprises a transformer 12 having a primary winding 14 and a secondary winding 16, both wound on a saturable core 18. The cathodes of a pair of tunnel diodes 20 are connected together and through a low voltage source 22, which may be a thermoelectric or thermionic source, to the center tap of the primary winding 14. The anodes of the tunnel diode 20 are connected to respective end terminals of the primary winding 14.

The tunnel diode inverter 10 operates as follows: When current starts to flow through the two tunnel diodes 20 from the source 22, as when the circuit is first connected up or turned on, more current will flow through one tunnel diode 20 than through the other due to the slight lack of symmetry of the diodes or of their circuit. Oppositely poled voltages will therefore be induced in the two halves of the primary winding 14, one of these voltages being higher than the other. The tunnel diode carrying the most current will be in its low voltage high current mode of operation and the other tunnel diode will be put into its high voltage low current mode by the voltage induced in the transformer winding 14 and applied thereto. As current through one half of the transformer primary 14 continues to increase in value, a time will be reached when the core 18 will saturate. At that time the voltage across the primary winding 14 will drop to zero and the diode that was in its high voltage low current state will swing to its high current low voltage state and draw sufficient current through its half of the primary winding 14 to drive the other tunnel diode 20 into its high voltage low current state. The current flow through the high current low voltage diode increases and again the core 18 saturates. When the core 18 next saturates, the two tunnel diodes 20 will again each reverse their states whereby the described circuit acts as an inverter. The transformer secondary 16 can transform the voltage applied across the transformer primary 14 from the source 22 to any desired values whereby a load (not shown) requiring high voltages may be supplied from the low voltage source 22.

Since the reversal of the direction of current flow of the inverter depends on the time at which core 18 becomes saturated, which itself depends on the current required by the load (not shown), the frequency of the output of the inverter 10 appearing across the secondary winding 16 will vary as the load changes. Furthermore, if the load drawn from the secondary winding 16 is so great as to prevent the core from saturating, shifting of current from one tunnel diode 20 to the other thereof takes place as follows: The high current, low voltage tunnel diode 20 cannot carry more than its peak current, whereby, upon demand by the load (not shown) connected across the output winding 16 for current greater than the low voltage peak current of the tunnel diode, the low voltage high current tunnel diode jumps from its low voltage high current state to its high voltage, low current state and current builds up in the other tunnel diode 20. That is, the overload in itself causes shift in current flow from one tunnel diode to the other. In accordance with this invention, apparatus to be described for periodically and momentarily overloading the tunnel diode inverter is provided to stabilize the frequency of the inverter 10 with respect to changes of load applied thereto.

The stabilizing apparatus 23 includes a third winding 24 on the saturable core transformer 18. The end terminals of the winding 24 are connected respectively to the collectors of a pair of transistors 26 whose emitters are connected together and to ground. The bases of the transistors 26 are connected together through a secondary winding of an input transformer 30, the center tap of this secondary winding being connected to ground. An alternating current control wave which may advantageously be of square shape, as shown at 32, is applied across the primary winding of the transformer 30. The frequency of the alternating current control wave 32 can be of any desired frequency, but should be higher than any frequency the tunnel diode inverter 10 will take in the absence of the described stabilizing apparatus as the load on the inverter changes.

The stabilizing circuit 23 which requires no voltage or bias supply, acts as a means for short-circuiting the winding 24, thereby overloading the tunnel diode oscillator 10 twice for each cycle of the control wave 32. In the absence of a control wave 32, neither transistor 26 is conductive and the transistors 26, 26 present an open circuit to the voltage induced in the winding 24. Due to the application of the voltage control wave 32, control voltage is applied to one transistor 26 to render it conductive and to the other transistor 26 to render it nonconductive. However, during the swing of the control voltage 32 from one polarity to the other, for a very short moment, both transistors 26 are conductive twice per cycle of the control wave 32. That is, assuming that one transistor 26 is conductive and the other is nonconductive due to the operation of the source 32, the one transistor that is conductive will remain conductive until the voltage between its base and emitter rises to the point where it is rendered nonconductive while the other transistor that was nonconductive becomes conductive before the first transistor is rendered nonconductive. During this short period of time, when both transistors 26 are conductive, the coil 24 is short-circuited by the two transistors 26 in series. Short-circuiting the coil 24 overloads the tunnel diode inverter 10 and thereby, as explained above, reverses the conductive state of the tunnel diodes 20, 20 and reverses the polarity of the output of the tunnel diode inverter 10. This short-circuiting takes place twice in each cycle of the control wave 32, that is, at a rate equal to twice the frequency of the control wave 32, whereby the polarity of the output of the tunnel diode inverter 10 reverses twice each cycle of the control wave 32. The frequency of the output of the tunnel diode inverter 10 is stabilized at the frequency of the control wave 32. Since the frequency of the control wave 32 is chosen to be higher than any frequency that the tunnel diode 10 will exhibit as the load thereon varies, the frequency of the output of the tunnel diode inverter is controlled by the control wave 32.

Although only a single frequency stabilizer for a tunnel diode inverter has been shown, variations are possible within the spirit of the present invention. For example, while transistor apparatus is disclosed for momentarily and periodically applying a short-circuit to the winding 24 to thereby overload the tunnel diode inverter 10 for controlling the frequency thereof, obviously other apparatus may be substituted therefor. For example, the winding 24 may be momentarily short-circuited by a rotating switch momentarily closing contacts. Similarly, although PNP transistors are shown, NPN transistors may be used. Furthermore, whether PNP or NPN transistors are used, the emitter and collector connections may be interchanged. Hence it should be understood that the foregoing description is to be considered as illustrative and not in a limiting sense.

What is claimed is:

1. The combination of a tunnel diode inverter including a saturable core inductor in which the frequency of the output thereof varies with the load applied thereto and a frequency control apparatus, said frequency control apparatus comprising driven means to momentarily and periodically withdraw an overloading amount of energy from said inverter at a rate higher than the highest frequency exhibited by said inverter due to changes in the load applied thereto, the flow of current in the output of said inverter reversing each time the inverter is overloaded, said driven means including connections for a source of control waves oscillating at said higher rate.

2. A frequency control apparatus for a tunnel diode inverter including a saturable core transformer having a primary winding and a load output winding in which the frequency of the output of the inverter varies with the load applied to said output winding comprising an additional winding on said transformer, means to momentarily and periodically short-circuit said additional winding at a rate higher than twice any frequency exhibited by said inverter due to changes in the load thereon, the flow of current in said transformer reversing each time said additional winding is short-circuited.

3. A frequency control apparatus for a tunnel diode inverter whose frequency varies with changes of load on said inverter, said inverter comprising a pair of tunnel diodes having first like-electrodes connected together, other like-electrodes connected together through an inductor having a saturable core, and a current source connected between a center tap of said inductor and said first like-electrodes, said frequency control apparatus comprising means for momentarily and periodically withdrawing an overloading amount of energy from said inverter at a rate higher than twice any frequency exhibited by said inverter due to changes in the load thereon, the current through said inductor reversing each time said inverter is overloaded.

4. A frequency control apparatus for a tunnel diode inverter comprising a pair of tunnel diodes having first like-electrodes connected together, other like-electrodes connected together through an inductor having a saturable core and a current source connected between a center tap of said inductor and said first like-electrodes, the frequency of said inverter varying with changes in load thereon, said frequency control apparatus comprising an additional winding on said saturable core, and means to momentarily and periodically short-circuit said winding at a rate higher than twice any frequency exhibited by said inverter due to the change in the load thereon, the current through said inductor reversing each time said inverter is overloaded.

5. A frequency control apparatus for a tunnel diode inverter comprising a pair of tunnel diodes having first like-electrodes connected together, other like-electrodes connected together through an inductor having a saturable core and a current source connected between a center tap of said inductor and said first like-electrodes, the frequency of said tunnel diode inverter varying with changes of load thereon, said frequency control apparatus comprising a winding having end terminals on said saturable core, a pair of transistors each having an input, an output and a common electrode, a connection from one of said end terminals to said output electrode of one of said transistors, a connection from the other of said end terminals to said output electrode of said other transistor, said common electrodes being connected together, and means to apply a periodic control voltage wave of a frequency higher than the frequency exhibited by said inverter upon variation of the load applied thereto to said input electrodes in phase opposition, said transistors being rendered momentarily and simultaneously conductive and applying a short-circuit to said additional winding to overload said inverter at a rate equal to twice the periodicity of said control wave, the current through said inductor reversing each time said inverter is overloaded, whereby said inverter is stabilized to operate at the frequency of said periodic control wave.

References Cited by the Examiner

UNITED STATES PATENTS

| | | | |
|---|---|---|---|
| 2,854,580 | 9/1958 | Uchrin et al. | 331—113 |
| 2,959,744 | 11/1960 | Wengryn | 331—113 |
| 2,976,461 | 3/1961 | Dilger et al. | 331—113 |
| 2,990,519 | 6/1961 | Wagner | 331—113 |
| 3,065,431 | 11/1962 | Geyger | 331—113 |
| 3,167,723 | 1/1965 | Marzolf | 331—113 |

OTHER REFERENCES

Geyger, Electronics, "Freq. Control of Magnetic MV," pp. 54–56, July 24, 1959.

ROY LAKE, *Primary Examiner.*

J. KOMINSKI, N. KAUFMAN, *Assistant Examiners.*